United States Patent
Ito et al.

(10) Patent No.: US 8,603,194 B2
(45) Date of Patent: Dec. 10, 2013

(54) BATTERY, MANUFACTURING METHOD OF BATTERY, AND CHECK METHOD OF ELECTROLYTE LEAKAGE

(75) Inventors: Kojiro Ito, Toyohashi (JP); Masato Onishi, Toyohashi (JP); Toshiyuki Yamashita, Toyohashi (JP); Michio Ozawa, Toyohashi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1438 days.

(21) Appl. No.: 11/296,495

(22) Filed: Dec. 8, 2005

(65) Prior Publication Data

US 2006/0134511 A1    Jun. 22, 2006

(30) Foreign Application Priority Data

Dec. 22, 2004  (JP) ................ 2004-371714

(51) Int. Cl.
*H01M 10/42*    (2006.01)
(52) U.S. Cl.
USPC .......................... 29/623.2; 429/90
(58) Field of Classification Search
USPC ..................................... 429/90
See application file for complete search history.

(56) References Cited

U.S. PATENT DOCUMENTS 3,773,563 A * 11/1973 Eaton et al. ............. 429/91
5,856,041 A * 1/1999 Inoue et al. ............. 429/182
6,106,969 A   8/2000 Lian et al.

FOREIGN PATENT DOCUMENTS

| FR | 2 089 062 | 1/1972 |
|---|---|---|
| GB | 1 387 560 | 3/1975 |
| GB | 2 164 200 A | 3/1986 |
| JP | S50-77078 | 6/1975 |
| JP | 8-45541 | 2/1996 |
| JP | 10-172618 | 6/1998 |
| JP | 2000-332379 | 11/2000 |
| JP | 2001-035460 | 2/2001 |
| JP | 2002-359010 | 5/2001 |
| JP | 2001-236986 | 8/2001 |
| JP | 2001-297799 | 10/2001 |
| JP | 2002-246072 | 8/2002 |
| JP | 2004-200012 | 7/2004 |

OTHER PUBLICATIONS

Machine translation of JP 2001-297799 (JPO; Oct. 26, 2001).*
Machine translation of JP 08045541 (JPO; Feb. 16, 1996).*
Machine translation of JP 2004-200012.*
European Search Report dated Feb. 3, 2006.

* cited by examiner

*Primary Examiner* — Maria J Laios
(74) *Attorney, Agent, or Firm* — Finnegan, Henderson, Farabow, Garrett & Dunner, LLP

(57) ABSTRACT

There is provided manufacturing method of battery comprising adhering process (S1) to adhere fluorescent material (leakage indicator including fluorescein) which emits fluorescence in response to predetermined light (ultraviolet radiation) irradiated under condition that electrolyte exists, to at least one portion of a surface on a battery case, and leakage detecting process (S2 through S9) to detect presence/absence of electrolyte leakage with fluorescence which an adhered portion emits in response to the predetermined light (ultraviolet radiation) irradiated on at least the adhered portion which has adhesion of the fluorescent material (leakage indicator including fluorescein), out of the surface on the battery case.

15 Claims, 7 Drawing Sheets

BATTERY, MANUFACTURING METHOD OF BATTERY, AND CHECK METHOD OF ELECTROLYTE LEAKAGE

BACKGROUND OF THE INVENTION

1. Field of the Invention

The present invention relates to a battery, a manufacturing method of battery, and a check method of electrolyte leakage.

2. Description of Related Art

As mobile appliances such as cellular phones, mobile-type personal computers, and the like are developed and practical use of pure electric vehicles, hybrid electric vehicles, and the like prevails, demands on not only primary batteries but also secondary batteries such as nickel hydride battery, lithium-ion battery, and the like has becomes larger. However, once electrolyte leakage occurs to those batteries, appliances have damages, which is problematic. Therefore, excellent sealing ability and electrolyte leakage proof performance have been required for batteries. Accordingly, accurate check method of electrolyte leakage has been required for manufacturing batteries and various check methods of electrolyte leakage have been proposed to meet such requests.

JP Unexamined Patent Publications Nos. 2001-297799 and 2002-246072 disclose check method of electrolyte leakage in which electrolyte leakage is judged by detecting fluorescence which electrolyte emits in response to irradiation of light which reacts on electrolyte and presence/absence of leakage is judged from a result of fluorescence detection.

JP Unexamined Patent Publication No. 2002-359010 discloses check method of electrolyte leakage in which fluorescent material is previously mixed in electrolyte and in case electrolyte leaks from a sealed portion after sealing, fluorescent material in electrolyte absorbs excitation energy and emits fluorescence, thereby to detect electrolyte leakage.

However, the check method disclosed in JP Unexamined Patent Publication No. 2001-297799 is effective to a battery of which electrolyte components include fluorescent material while not applicable to a battery of which electrolyte components do not include fluorescent material (solution-type battery such as nickel hydride battery, for example). Furthermore, since fluorescent material must be selected when composing electrolyte, composition of electrolyte is sometimes restricted.

In JP Unexamined Patent Publication No. 2002-246072, fluorescent material is previously mixed in electrolyte. However, when fluorescent material is mixed in electrolyte, fluorescent material reacts on other components of electrolyte and gets decomposed in a battery, whereby battery performance deteriorates considerably.

SUMMARY OF THE INVENTION

The present invention has been made in view of the above circumstances and has an object to overcome the above problems and to provide check method of electrolyte leakage capable of appropriately detecting presence/absence of electrolyte leakage without damages on battery performance, manufacturing method of battery, and a battery.

According to a first aspect of the present invention, there is provided manufacturing method of battery which includes a battery case and electrolyte housed in the battery case, the manufacturing method comprising: adhering process to adhere fluorescent material which emits fluorescence in response to predetermined light irradiated under condition that predetermined components included in the electrolyte exist, to at least one portion of a surface on the battery case; and leakage detecting process to detect presence/absence of electrolyte leakage with fluorescence which an adhered portion emits in response to the predetermined light irradiated on at least the adhered portion which has adhesion of the fluorescent material, out of the surface of the battery case.

The inventive manufacturing method of battery comprises adhering process to adhere fluorescent material which emits fluorescence in response to predetermined light irradiated under condition that predetermined components included in the electrolyte exist, to at least one portion of a surface on the battery case. That is, different from conventional batteries, fluorescent material is not added in electrolyte but adhered to at least one portion of a surface on the battery case. Accordingly, conventional battery-characteristic deterioration caused by adding fluorescent material to electrolyte does not occur to the present invention. Furthermore, electrolyte can be composed with appropriate electrolyte components regardless of presence/absence of fluorescent material.

Furthermore, the inventive manufacturing method of battery also comprises leakage detecting process to detect presence/absence of electrolyte leakage with fluorescence which an adhered portion emits in response to the predetermined light irradiated on at least the adhered portion which has adhesion of the fluorescent material, out of the surface of the battery case. Accordingly, in case electrolyte leaks from a battery case, fluorescent material emits fluorescence at a portion where electrolyte touches fluorescent material. Therefore, the inventive manufacturing method makes it possible to appropriately judge presence/absence of electrolyte leakage (poor sealing of a battery case), extent of electrolyte leakage, position of electrolyte leakage, and the like without affecting on battery characteristic.

Any fluorescent material can be used as long as emitting fluorescence in response to irradiation of predetermined light under condition that predetermined components included in the electrolyte exist. For example, fluorescein, calcein blue, umbelliferone can be used as fluorescent material which emits fluorescence in response to irradiation predetermined light under condition that predetermined components included in alkali electrolyte exist. Above all, fluorescein is preferable for use because it emits strong fluorescence under condition of alkali electrolyte (more specifically, alkali metal ion) existing. In case fluorescein is adhered to a surface on the battery case, fluorescein is preferably applied as ethyl alcohol solution.

Furthermore, in the leakage detecting process, a man may judge presence/absence of electrolyte leakage in accordance with visual check, a fluorescent image (gray-scale image) of a battery or a portion thereof imaged by an imaging device. Alternatively, imaging process may be applied to a fluorescent image (gray-scale image) of a battery or a portion thereof imaged by an imaging device so as to automatically judge presence/absence of electrolyte leakage.

Furthermore, in the inventive manufacturing method of battery, it is preferable that the leakage detecting process further comprises detecting process to detect presence/absence of electrolyte leakage in accordance with space size of a portion which belongs to the adhered portion and emits fluorescence which exceeds predetermined strength.

Strength of fluorescence which fluorescent material emits under existence of electrolyte is previously inspected. In case there is a portion which emits fluorescence of which strength is higher than fluorescence strength (predetermined strength), electrolyte leakage is suspected at the portion. However, such method is problematic because erroneous detection is also regarded as electrolyte leakage, for example, when a measuring device and the like erroneously detect a portion which emits fluorescence higher than predetermined strength.

On the other hand, the detecting process of the present invention detects presence/absence of electrolyte leakage on the basis of space size of a portion which emits fluorescent exceeding predetermined strength but not just presence/absence of a portion which emits fluorescent exceeding predetermined strength. In case space size (area) of a portion which emits fluorescence exceeding predetermined strength is larger than predetermined size, it is considered as electrolyte leakage without doubt. Therefore, the detecting process of the present invention can appropriately detect presence/absence of electrolyte leakage.

Furthermore, in the inventive manufacturing method of battery, it is preferable that in the detecting process, the adhered portion is imaged by an imaging device to obtain a fluorescent image, and presence/absence of electrolyte leakage is detected in accordance with number of pixels judged as emitting fluorescence stronger than the predetermined fluorescence strength which corresponds to threshold set in bi-level process applied to each pixel of the fluorescent image.

For example, in case fluorescent material has property to emit fluorescence without reacting on electrolyte and to emit even stronger fluorescence when reacting on electrolyte, it is difficult to distinguish fluorescence emitted by fluorescent material which has reacted on electrolyte from fluorescence emitted by fluorescent material which has not reacted on electrolyte.

On the other hand, in the detecting process of the present invention, there is set a border value between fluorescent strength emitted by fluorescent material which has reacted on electrolyte and fluorescent strength emitted by fluorescent material which has not reacted on electrolyte as threshold for bi-level process. Thereby, fluorescence emitted by fluorescent material which has reacted on electrolyte can be detected appropriately. Furthermore, after detecting fluorescent strength, presence/absence of electrolyte leakage is judged on the basis of the number of pixels belonging to a fluorescent region recognized through bi-level process. Therefore, presence/absence of electrolyte leakage can be detected accurately.

Furthermore, in the above-mentioned any manufacturing method of battery, it is preferable that the battery case comprises a battery jar which is a box shape with a bottom to house power generator elements and a sealing member which seals an opening of the battery jar, and in the adhering process, the fluorescent material is adhered to at least either border of the battery jar and the sealing member or neighborhood of the border, out of the battery case.

For example, in case of a battery case constituted by jointing a battery jar and a sealing member, it is at the joint portion of the battery jar and the sealing member that electrolyte leakage is most likely to occur. Therefore, in the inventive manufacturing method, fluorescent material is adhered to the border of the battery jar and the sealing member or neighborhood of the border. By restrictively adhering fluorescent material to a portion and its neighborhood where leakage can possibly occur, presence/absence of electrolyte leakage can be detected appropriately without using excessive fluorescent material.

It is to be noted that the power generator elements are stuff to be arranged in the battery case to play parts of battery performance, and electrodes, separators, electrolyte and the like correspond to the power generator elements.

Furthermore, in the above-mentioned any manufacturing method of battery, it is preferable that the electrolyte is alkali electrolyte and the fluorescent material is fluorescein.

Fluorescein emits vivid fluorescence when reacting on cation (alkali metal ion) included in alkali electrolyte. Therefore, the inventive manufacturing method can detect electrolyte leakage accurately.

Furthermore, in the inventive manufacturing method of battery, it is preferable that the predetermined light for making the fluorescence emit is ultraviolet radiation.

Fluorescein has property to emit fluorescence in solution even though not reacting on cation included in alkali electrolyte. Therefore, for example, in case solution inclusive of fluorescein is applied to a surface of the battery case in adhering process, entirety of the adhered portion emits fluorescence when light is irradiated in the leakage detecting process, and a portion of electrolyte leakage emits fluorescence more vividly than other portions when electrolyte leakage has occurred. Accordingly, presence/absence of electrolyte leakage is detected depending on whether or not the adhered portion has a portion which emits fluorescence more vividly than other portions among there.

In the inventive manufacturing method, ultraviolet radiation is used (ultraviolet radiation is irradiated in the leakage detecting process) as predetermined light for making fluorescence emit. Thereby, difference between fluorescent strength which an electrolyte-leakage portion (fluorescein which has reacted on electrolyte) emits and fluorescent strength which fluorescein just emits without reacting on electrolyte can be made large. Accordingly, presence/absence of electrolyte leakage can be detected easily and accurately.

Furthermore, in the above-mentioned any manufacturing method of battery, it is preferable to further comprise charging/discharging process to charge/discharge the battery before the leakage detecting process.

Since inner pressure of a battery rises by charging/discharging the battery, presence/absence of electrolyte leakage can be detected under condition that electrolyte leakage is likely to occur. Therefore, poor sealing of a battery case (defective jointing of component members which constitute the battery case and the like, for example) can be detected accurately. The charging/discharging process can be arranged before or after, whichever, the adhering process as long as it is before the leakage detecting process.

Furthermore, in the above-mentioned any manufacturing method of battery, it is preferable to further comprise aging process to lay the battery under high temperature atmosphere for a predetermined period before the leakage detecting process.

By laying a battery under high temperature atmosphere for a predetermined period, inner pressure of the battery rises. That is, presence/absence of electrolyte leakage can be detected under condition that electrolyte leakage is likely to occur. Therefore, poor sealing of a battery case (defective jointing of component members which constitute the battery case and the like, for example) can be detected accurately. The aging process can be arranged before or after, whichever, the adhering process as long as it is before the leakage detecting process.

Furthermore, in the above-mentioned any manufacturing method of battery, it is preferable to further comprise decompressing process to lay the battery under decompressed atmosphere of 0.1 MPa or lower before the leakage detecting process.

By laying a battery under decompressed atmosphere of 0.1 MPa or lower, inner pressure of the battery becomes relatively higher in comparison with the external. That is, presence/absence of electrolyte leakage can be detected under condition that electrolyte leakage is likely to occur. Therefore, poor sealing of a battery case (defective jointing of component members which constitute the battery case and the like, for example) can be detected accurately. The decompressing process can be arranged before or after, whichever, the adhering process as long as it is before the leakage detecting process.

According to a second aspect of the present invention, there is provided check method of electrolyte leakage for a battery which includes a battery case and electrolyte housed in the battery case, the check method checking presence/absence of electrolyte leakage with fluorescence emitted from at least an adhered portion, out of a surface of the battery case, which has adhesion of fluorescent material which emits fluorescence in response to irradiation of predetermined light under condition that predetermined components included in the electrolyte exist.

The inventive check method detects presence/absence of electrolyte leakage with fluorescence which an adhered portion case (i.e., a portion covered with fluorescent material which emits fluorescence when the predetermined light is irradiated under condition that predetermined components included in electrolyte exit) emits in response to the predetermined light irradiated on at least the adhered portion which has adhesion of the fluorescent material, out of the surface on the battery case. Accordingly, in case electrolyte leaks from the battery case, fluorescent material emits fluorescence at a portion where electrolyte touches fluorescent material. Therefore, the inventive check method makes it possible to appropriately judge presence/absence of electrolyte leakage (poor sealing of a battery case), extent of electrolyte leakage, position of electrolyte leakage, and the like without affecting on battery characteristic.

The inventive check method is not restricted to check in the course of manufacturing process but is also applicable to batteries after shipped from a factory. For example, the check method can be used at acceptance test of delivered battery, or inspection of electrolyte leakage with respect to batteries used by users for a predetermined period and leakage-suspected batteries.

Furthermore, in the inventive check method of electrolyte leakage, it is preferable that the presence/absence of electrolyte leakage is detected in accordance with space size of a portion which emits belongs to the adhered portion and emits fluorescence which exceeds predetermined strength.

Strength of fluorescence which fluorescent material emits under existence of electrolyte is previously inspected. That is, in case there is a portion which emits fluorescence of which strength is higher than fluorescence strength (predetermined strength), electrolyte leakage is suspected at the portion. However, such method is problematic because erroneous detection is also regarded as electrolyte leakage, for example, when a measuring device and the like erroneously detect a portion which emits fluorescence higher than predetermined strength.

On the other hand, the inventive check method detects presence/absence of electrolyte leakage on the basis of space size of a portion which emits fluorescent exceeding predetermined strength but not just presence/absence of a portion which emits fluorescent exceeding predetermined strength. In case space size (area) of a portion which emits fluorescent exceeding predetermined strength is larger than predetermined size, it is considered as electrolyte leakage without doubt. Therefore, the inventive check method can appropriately detect presence/absence of electrolyte leakage.

Furthermore, in the above-mentioned any check method of electrolyte leakage, it is preferable that the electrolyte is alkali electrolyte and the fluorescent material is fluorescein.

Fluorescein emits vivid fluorescence when reacting on cation (alkali metal ion) included in alkali electrolyte. Therefore, the inventive check method can detect electrolyte leakage accurately.

Furthermore, in the inventive check method of electrolyte leakage, it is preferable that at least either water or organic solvent is added to at least the adhered portion in the surface of the battery case before irradiating the predetermined light which makes the fluorescence emit.

As already described, fluorescein emits vivid fluorescence when reacting on cation (alkali metal ion) included in alkali electrolyte. Accordingly, since the adhered portion does not emit fluorescence even though the predetermined light is irradiated there on in case the adhered portion is dry, electrolyte leakage cannot be detected.

Therefore, in the inventive check method, at least either water or organic solvent is added to at least the adhered portion out of the surface on the battery case (mixed solution of water and ethyl alcohol is sprayed, for example) before irradiating the predetermined light which makes the fluorescence emit. Therefore, in case electrolyte leaks, fluorescein reacts on cation included in alkali electrolyte and emits fluoresce vividly when light is irradiated.

Furthermore, in the above-mentioned any check method of electrolyte leakage, it is preferable that the predetermined light for making fluorescence emit is ultraviolet radiation.

Fluorescein has property to emit fluorescence in solution even though not reacting on cation included in alkali electrolyte. Therefore, for example, in case solution inclusive of fluorescein is applied to a surface of the battery case, entirety of the adhered portion emits fluorescence when light is irradiated, and a portion of electrolyte leakage emits fluorescence more vividly than other portions when electrolyte leakage has occurred. Accordingly, presence/absence of electrolyte leakage is detected depending on whether or not the adhered portion has a portion which emits fluorescence more vividly than other portions among there.

In the inventive check method, ultraviolet radiation is used (ultraviolet radiation is irradiated on the adhered portion) as predetermined light for making fluorescence emit. Thereby, difference between fluorescent strength which an electrolyte-leakage portion (fluorescein which has reacted on electrolyte) emits and fluorescent strength which fluorescein just emits without reacting on electrolyte can be made large. Accordingly, presence/absence of electrolyte leakage can be detected easily and accurately.

Furthermore, in the above-mentioned any check method of electrolyte leakage, it is preferable that the battery is charged/discharged before irradiating the predetermined light which makes the fluorescence emit.

Since inner pressure of a battery rises by charging/discharging the battery, presence/absence of electrolyte leakage can be detected under condition that electrolyte leakage is likely to occur. Therefore, poor sealing of a battery case or its deterioration (defective jointing of component members which constitute the battery case, the members' deterioration, and the like) can be detected accurately.

Furthermore, in the above-mentioned any check method of electrolyte leakage, it is preferable that the battery is laid under high temperature atmosphere for a predetermined period before irradiating the predetermined light which makes the fluorescence emit.

By laying a battery under high temperature atmosphere for a predetermined period, inner pressure of the battery rises. That is, presence/absence of electrolyte leakage can be detected under condition that electrolyte leakage is likely to occur. Therefore, poor sealing of a battery case or its deterioration (defective jointing of component members which constitute the battery case, the members' deterioration, an the like) can be detected accurately.

Furthermore, in the above-mentioned any check method of electrolyte leakage, it is preferable that the battery is laid under decompressed atmosphere of 0.1 MPa or lower before irradiating the predetermined light which makes the fluorescence emit.

By laying a battery under decompressed atmosphere of 0.1 MPa or lower, inner pressure of the battery becomes comparatively higher. That is, presence/absence of electrolyte leakage can be detected under condition that electrolyte leakage is likely to occur. Therefore, poor sealing of a battery case or its deterioration (defective jointing of component members which constitute the battery case, the members' deterioration, and the like) can be detected accurately.

According to a third aspect of the present invention, there is provided a battery comprising: a battery case; and electrolyte housed in the battery case, wherein at least a part of a surface on the battery case has fluorescent material which emits fluorescence in response to predetermined light irradiated under condition that predetermined components included in the electrolyte exist.

The battery comprises fluorescent material in at least a portion of a surface on the battery case where fluorescent material emits fluorescence when the predetermined light is irradiated under condition that predetermined components included in the electrolyte. That is, fluorescent material is not mixed in electrolyte, and since fluorescent material is provided on the surface of the battery case, battery characteristic is never affected. Furthermore, in the inventive battery, fluorescent material emits fluorescence at a portion where electrolyte touches fluorescent material in case electrolyte leaks. Therefore, the inventive battery makes it possible to appropriately judge presence/absence of electrolyte leakage (poor sealing of a battery case, and the like), extent of electrolyte leakage, position of electrolyte leakage, and the like depending on whether or not fluorescence emitted by fluorescent material is detected.

Furthermore, in the inventive battery, it is preferable that the electrolyte is alkali electrolyte and the fluorescent material is fluorescein.

Fluorescein emits vivid fluorescence when reacting on cation (alkali metal ion) included in alkali electrolyte. Therefore, the inventive battery makes it possible to detect electrolyte leakage accurately.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

A detailed description of a preferred embodiment of the inventive manufacturing method will be described by referring to the accompanying drawings.

Figure 1:
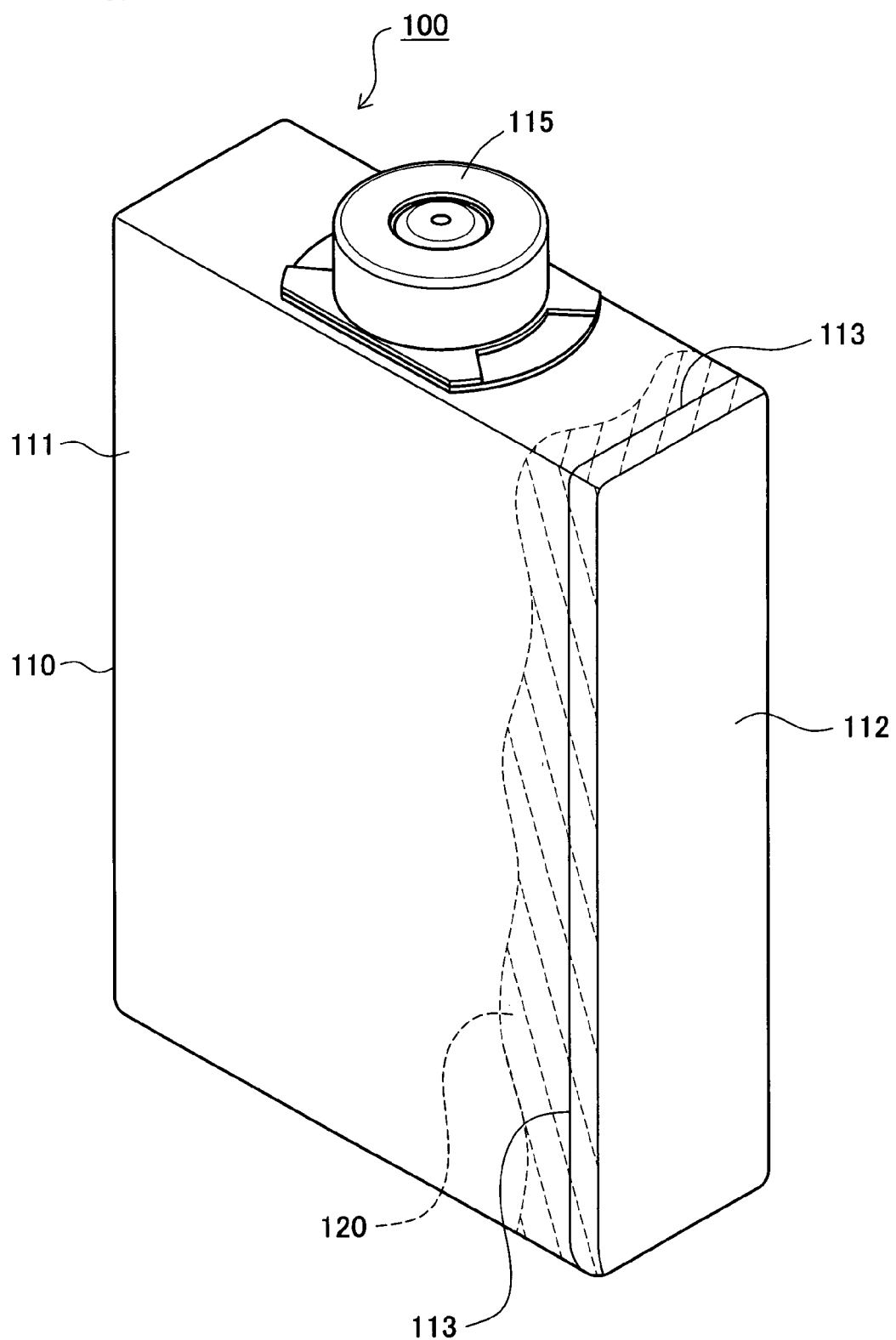
FIG. 1 is a perspective view of a battery 100 directed to an embodiment.

FIG. 1 is a perspective view of a battery 100 directed to the present embodiment. As shown in FIG. 1, a battery 100 is a rectangular-sealed-type nickel hydride secondary battery which consists of a metallic (specifically, nickel-coated sheet steel) battery case 110, a safety valve 115, polar plate group 116 (see FIG. 2) and electrolyte (not shown) that are arranged inside of the battery case 110.

Figure 2:
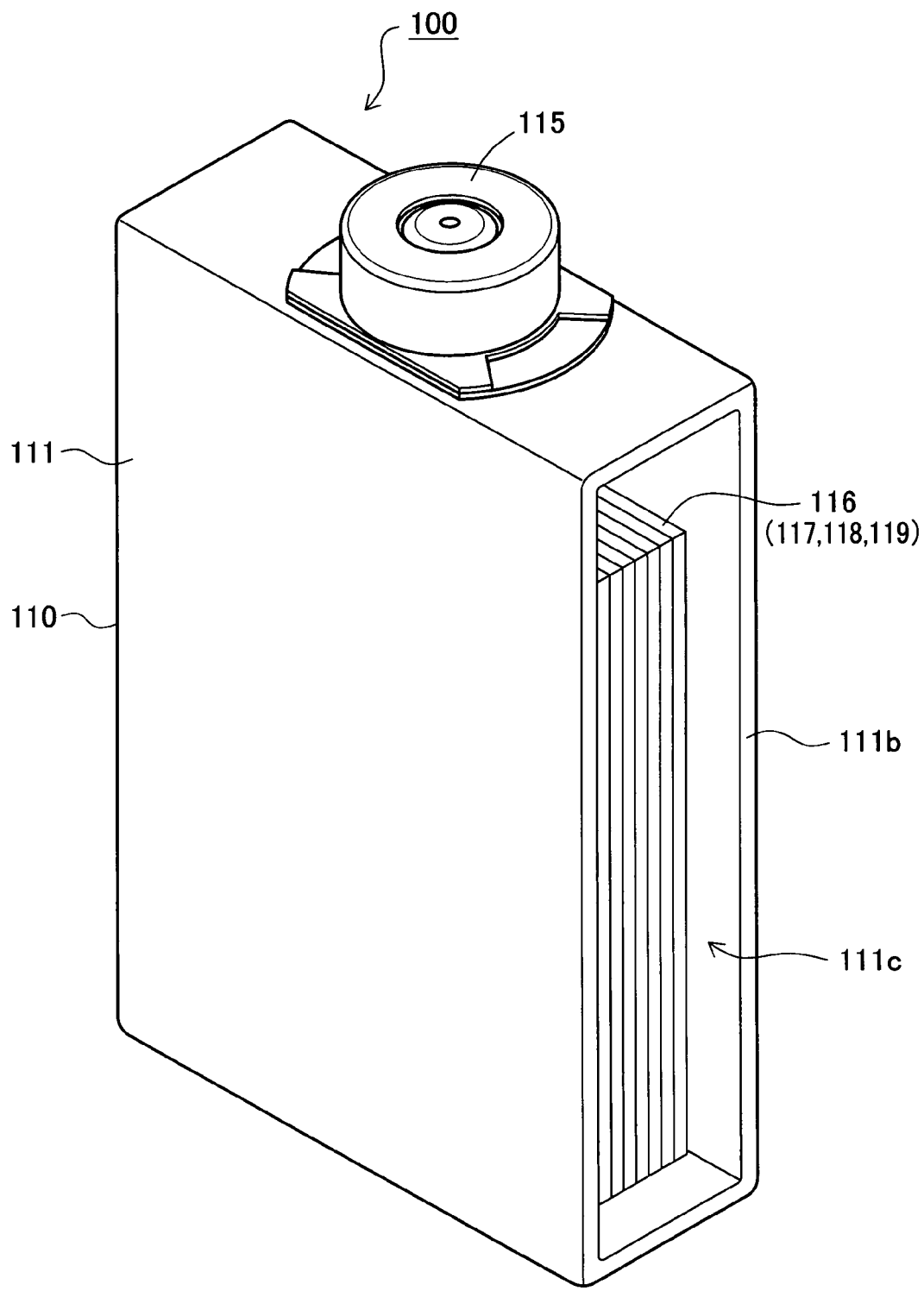
FIG. 2 is a perspective view of the battery 100 of which sealing member 112 is taken away.

As shown in FIG. 2, the polar plate group 116 has positive poles 117, negative poles 118, and pouched separators 119. The positive poles 117 are inserted in the pouched separators 119, and the positive poles 117 inserted in the pouched separators 119 and the negative poles 118 are alternately laminated. The positive poles 117 and the negative poles 118 are separately collected and connected to a positive polar terminal and a negative polar terminal (both not shown), respectively.

As a positive pole 117, an electrode plate consisting of active material inclusive of nickel hydroxide and active material supporting body such as foam nickel, for example, can be used. As a negative pole 118, an electrode plate inclusive of hydrogen storing alloy as negative polar constituent material, for example, can be used. As a separator 119, non-woven fabric consisting of hydrophilization-treated synthetic fiber, for example, can be used. As electrolyte, ratio 1.2-1.4 of alkali solution including KOH, for example, can be used.

As shown in FIG. 1, the battery case 110 is made of metal (specifically, nickel-coated sheet steel) and consists of a rectangular-box shaped battery jar 111 and a rectangular-plate like sealing member 112. Entire periphery of the sealing member 112 is welded in contact with opening end surface 111b (see FIG. 2) of the battery jar 111 thereby to seal an opening portion 111c of the battery jar 111. The sealing member 112 and the battery jar 111 are thus integrated to constitute a battery case 110.

Furthermore, as indicated with broken lines in FIG. 1, the battery 100 directed to the present embodiment has an adhered portion 120 to which fluorescein is adhered. The adhered portion 120 corresponds to a border portion 113 (welded portion) of the sealing member 112 and the battery jar 111 and neighborhood of the border portion 113, on the surface of the battery case 110. Furthermore, as described later, fluorescein is fluorescent material and has property to emit strong fluorescence when reacting on cation (alkali metal ion) included in alkali electrolyte.

First of all, a battery is assembled in assembling process as follows. Plural pouched separators 119 are arranged and positive poles 117 are inserted between the pouched separators 119. Next, the plural pouched separators 119 with positive poles 117 inserted and plural negative poles 118 are laminated alternately, thereby to constitute a polar plate group 116. After inserting the polar plate group 116 in the battery jar 116, the entire periphery of the sealing member 112 is welded in contact with the opening end surface 111b of the battery jar 111 thereby to seal the battery jar 111 with the sealing member 112. Thereby, the sealing member 112 and the battery jar 111 are integrated to constitute a battery case 110. After that, a safety valve 115 is arranged on a predetermined position of the battery case 110.

Next, it goes on to charging/discharging process and charging/discharging of the thus assembled battery is conducted. Through the charging/discharging of the battery, inner pressure of the battery rises significantly.

Next, it goes on to aging process and the charging/discharging-conducted battery is laid in a temperature-controlled room maintained at 40° C. for a week. Through the aging process, inner pressure of the battery rises again.

By making inner pressure of a battery rise before conducting electrolyte leakage check, the battery to be checked can have electrolyte leakage check under condition that electrolyte leakage is likely to occur.

Next, electrolyte leakage check is conducted for a battery to which aging process has been applied (mentioned as checked battery 100B, hereinafter), as follows.

Figure 3:
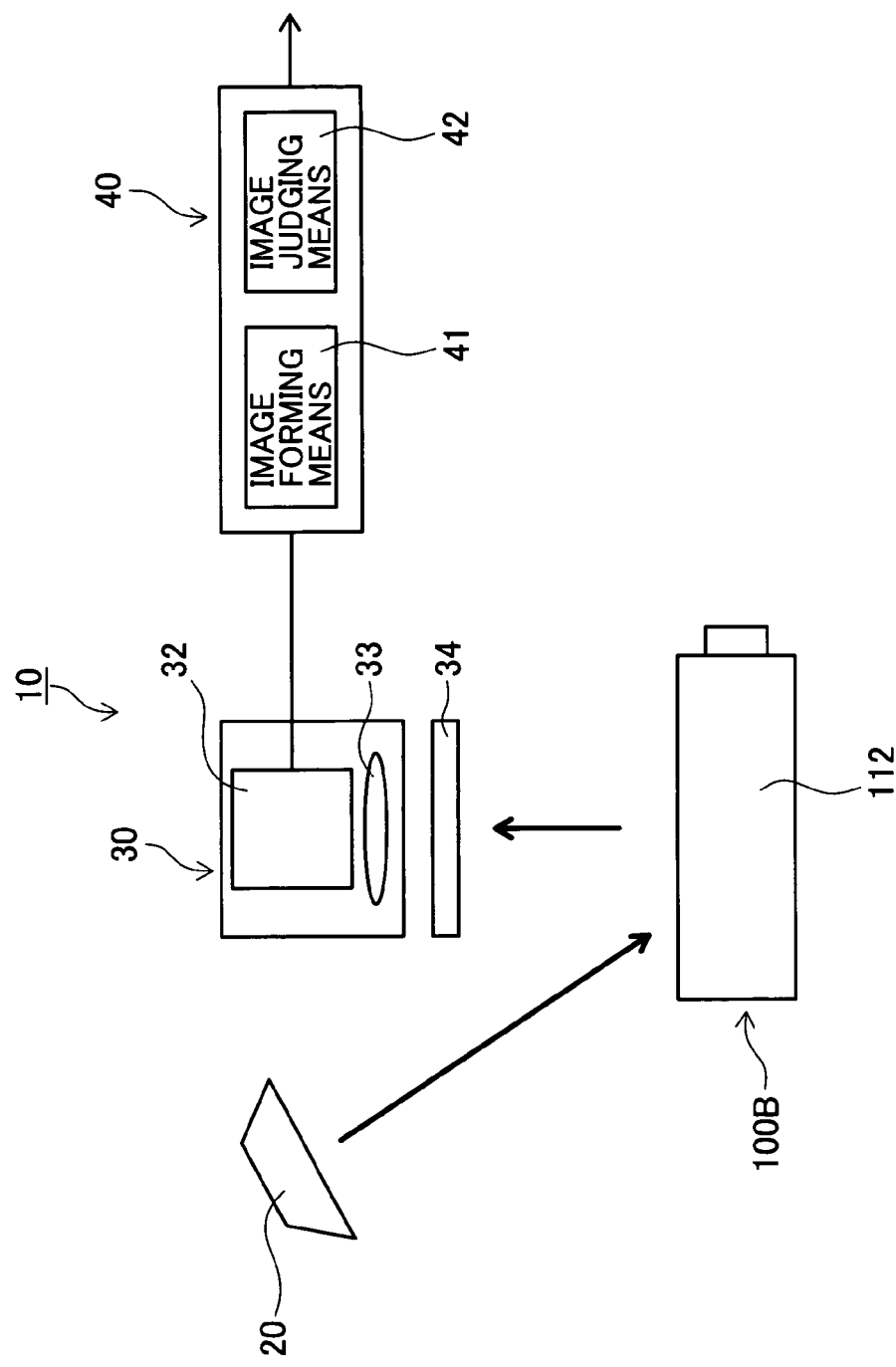
FIG. 3 is a schematic diagram of an electrolyte-leakage check device directed to the embodiment.

Firstly, there will be described an electrolyte-leakage check device 10 used for electrolyte leakage check by referring to FIG. 3. The electrolyte leakage check device 10 includes an irradiating unit 20, a detecting unit 30, and a judging unit 40.

The irradiating unit 20 is to irradiate ultraviolet radiation on a surface of a battery case 110. The detecting unit 30 includes a light sensor 32 (a CCD is used in the embodiment), a light receiving lens 33, and an optical filter 34 which transmits fluorescence of a specific wavelength band (between 510 and 530 nm in the embodiment). Therefore, the detecting unit 30 can selectively transmit fluorescence of the specific wavelength band (between 510 and 530 nm in the embodiment) out of fluorescence emitted from a surface of the battery case 110 and ambient light using the optical filter 34, and deliver the fluorescence to the light sensor 32 through the light receiving lens 33. Furthermore, the light sensor 32 can convert the fluorescence into electric detection signals and output them to the judging unit 40. It is to be noted that the light sensor 32 (CCD) can sort out strength of detected light into 256 gradations (levels of gray-scale).

The judging unit 40 is constituted with ROM, RAM, CPU, and the like, and includes image forming means 41 and image judging means 42. Of the judging unit 40, the image forming means 41 can form a gray-scale image (fluorescent image) in accordance with detection signals from the light sensor 30 (see FIG. 6A and FIG. 7A).

The image judging means 42 can judge presence/absence of electrolyte leakage from a battery case 110 in accordance with a gray-scale image formed by the image forming means 41. Specifically, predetermined fluorescent strength is determined and set as threshold, and bi-level process is done for each pixel of the gray-scale image formed by the image forming means 41. A bi-leveled image can be formed by such that pixels judged as emitting fluorescence of which strength is higher than the predetermined fluorescent strength are indicated in white whereas pixels judged as emitting fluorescence of which strength is lower than the predetermined fluorescent strength are indicated in black (see FIG. 6B and FIG. 7B). Furthermore, as to the obtained bi-leveled image, the number of pixels indicated in white is accumulated. In case total number of white pixels exceeds a predetermined value, it is judged as electrolyte leakage and in case the total lowers the predetermined value, it is judged as no electrolyte leakage.

Electrolyte-leakage judgment criteria on the image judging means 42 is determined as follows.

Firstly, a battery to which electrolyte leakage has not occurred (sample A) and a battery to which electrolyte leakage has occurred (sample B) are prepared, and as to each sample, leakage indicator is sprayed to a border portion (welded portion) 113 of a sealing member 112 and a battery jar 111 and neighborhood of the border portion 113. Thus, an adhered portion 120 (see FIG. 1) to which leakage indicator (fluorescein) is applied is formed at the border portion 113 of the sealing member 112 and the battery jar 111 and its neighborhood.

In the present embodiment, solution composed by mixing fluorescein in ethyl alcohol is used as leakage indicator. This leakage indicator has property to emit fluorescence when ultraviolet radiation is irradiated thereon and also, property to emit even stronger fluorescence when reacting on cation included in alkali electrolyte (alkali metal ion).

Figure 4:
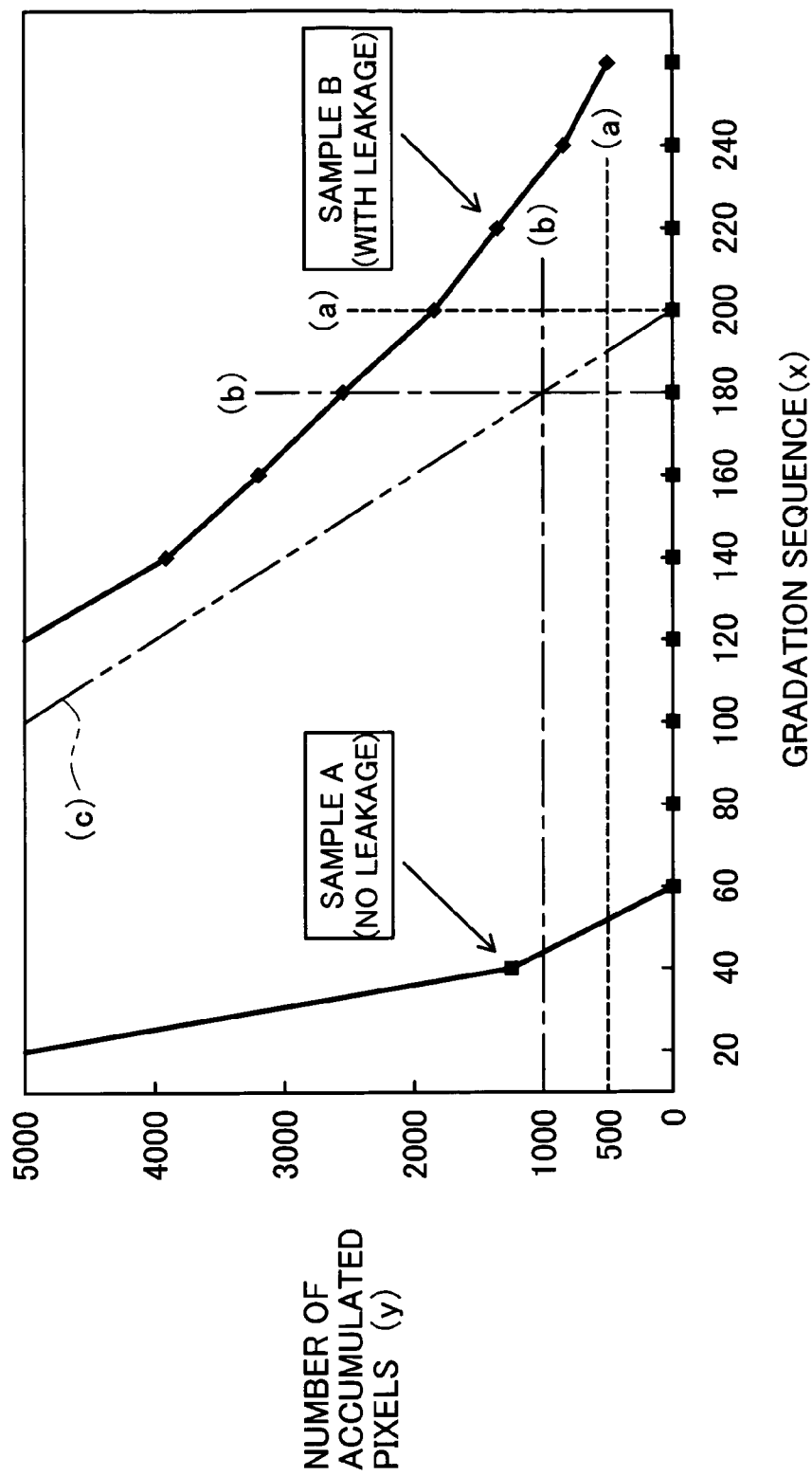
FIG. 4 is a graph comparatively showing relation of threshold of bi-level process (gradation sequence) and the number of accumulated pixels with reference to a sample battery without electrolyte leakage and a sample battery with electrolyte leakage.

Next, the irradiating unit 20 irradiates ultraviolet radiation on the samples A and B to detect fluorescence emitted from their adhered portions 120 by using detecting unit 30, and relation of threshold of bi-level process and the number of accumulated pixels is researched by using the judging unit 40. A graph of FIG. 4 shows research result of it. As shown in FIG. 4, fluorescence with strength exceeding 60 gradations is not detected from the sample A (without leakage). On the other hand, gradations of fluorescence detected from the sample B (with leakage) is larger than that of sample A. Specifically, for example, in case threshold at bi-level process is set to 200 gradations, the total number of pixels exceeding 200 gradations is about 1800. Also, in case threshold at bi-level process is set to 180 gradations, the total number of pixels exceeding 180 gradations is about 2500.

According to the result, for example, in case threshold at bi-level process is set to an optional value between 60 and 256 gradations and total number of pixels of which gradations is higher than the threshold exceeds a predetermined value, it can be judged that electrolyte leakage has occurred.

Specifically, for example, in case threshold at bi-level process is set to 200 gradations indicated as (a) with broken lines in FIG. 4 and the total number of pixels of higher than 200 gradations (pixels indicated in white) exceeds 500, it may be judged that electrolyte leakage has occurred. Furthermore, in case threshold at bi-level process is set to 180 gradations indicated as (b) with alternate long and short dash lines in FIG. 4 and the total number of pixels of higher than 180 gradations (pixels indicated in white) exceeds 1000, it may be judged that electrolyte leakage has occurred. Alternatively, threshold at bi-level process may be optionally set to a value x between 60 and 254 gradations. In case the total number of pixels higher than the optionally-set threshold x is defined as y indicated as (c) with chain double-dashed lines in FIG. 4 and an inequality, $y \geq -50x + 10000$, is satisfied, it may be judged that electrolyte leakage has occurred. However, in case threshold x is set to 200 or larger gradations, the case satisfying an inequality, $y > 0$, is judged that electrolyte leakage has occurred.

Following the above method, presence/absence of electrolyte leakage can be detected appropriately.

Figure 5:
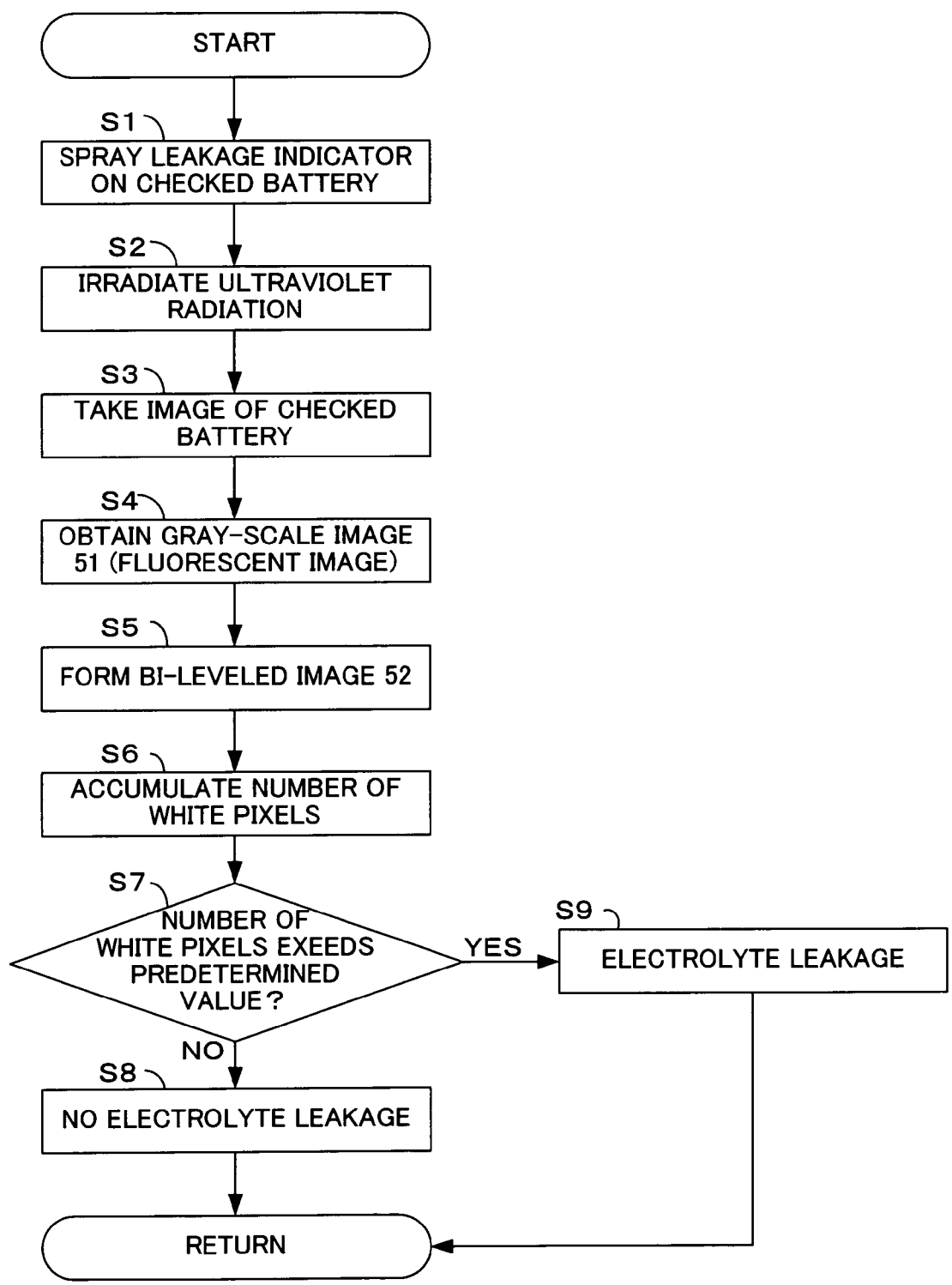
FIG. 5 is a flowchart showing flow of electrolyte-leakage check directed to the embodiment.

Next, there will be described check method of electrolyte leakage directed to the present embodiment by referring to the flowchart in FIG. 5.

As to a battery 100 of the present embodiment, a battery jar 111 and a sealing member 112 are welded together. Therefore, if electrolyte should leak, it can be considered that the border portion (welded portion) 113 of the battery jar 111 and the sealing member 112 is the leakage portion with high possibility. Accordingly, in the present embodiment, electrolyte leakage check is conducted at the border portion (welded portion) 113 of the battery jar 111 and the sealing member 112 and neighborhood of the border portion 113.

Firstly, at step S1, leakage indicator (fluorescein) is sprayed on the border portion (welded portion) 113 of the battery jar 111 and the sealing member 112 and the neighborhood of the border portion 113 with respect to the checked battery 100B. Next, it goes on to step S2 and, as shown in FIG. 3, the checked battery 100B is placed on the predetermined position in the electrolyte-leakage check device 10 and ultraviolet radiation is irradiated on the surface of the battery case 110 by using the irradiating unit 20. Next, it goes on to step S3 in which only fluorescence of wavelength band (between 510 and 530 nm in the embodiment) is selectively detected from fluorescence and ambient light emitted from the surface of the battery case 110 by using the detecting unit 30.

Figure 6A:
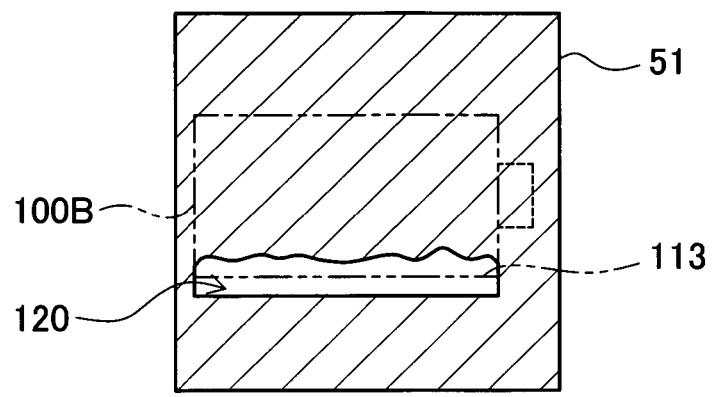
FIG. 6A is a diagram showing a fluorescent image of the battery without electrolyte leakage.
Figure 7A:
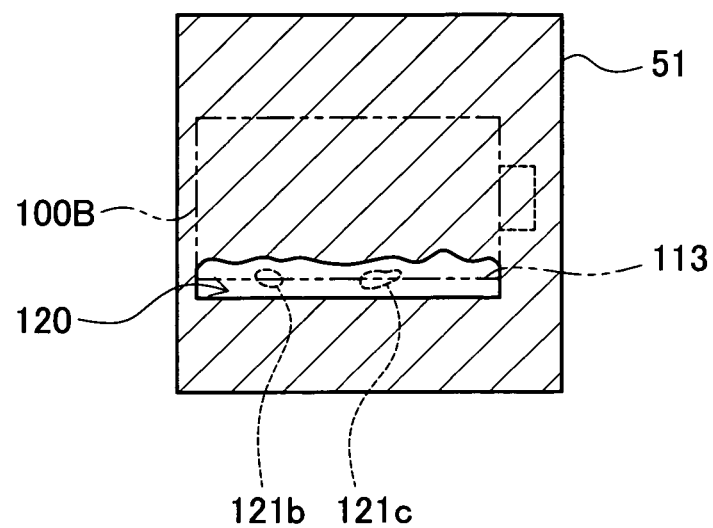
FIG. 7A is a diagram showing a fluorescent image of the battery with electrolyte leakage.

Next, it goes on to step S4 in which a gray-scale image 51 (fluorescent image) is formed by the image forming means 41 of the detecting unit 40 in accordance with detection signals outputted from the light sensor 30 (see FIG. 6A and FIG. 7A). In this regard, FIG. 6A is a gray-scale image 51 (fluorescent image) of a checked battery 100B which does not have electrolyte leakage and FIG. 7A is a gray-scale image 51 (fluorescent image) of a checked battery 100B which has electrolyte leakage. In comparison with FIG. 6A and FIG. 7A, it is apparent that FIG. 6A is an image in which entirety of the adhered portion 120 is similarly bright whereas FIG. 7A is an image in which there are portions brighter than other portions in the adhered portion 120 (leakage portions 121b and 121c correspond to the brighter portions, described later).

Figure 6B:
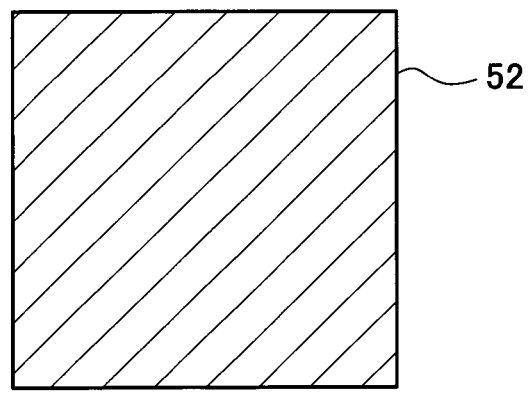
FIG. 6B is a diagram showing a bi-leveled image obtained by applying bi-level process to the fluorescent image of FIG. 6A.
Figure 7B:
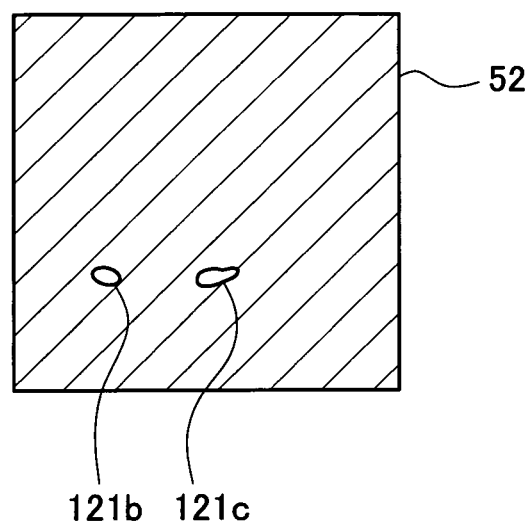
FIG. 7B is a diagram showing a bi-leveled image obtained by applying bi-level process to the fluorescent image of FIG. 7A.

Next, it goes on to step S5 in which a bi-leveled image 52 is formed. by the image judging means 42 of the judging unit 40 in accordance with a gray-scale image 51 (fluorescent image), (see FIG. 6B and FIG. 7B). Specifically, as previously described, bi-level process is applied to each pixel of the gray-scale image 51 with threshold being set to 60 gradations to form a bi-leveled image 52 in which pixels emitting fluorescence higher than the threshold and pixels lower than the threshold are indicated in white and black, respectively. FIG. 6B is a bi-leveled image 52 (fluorescent image) of a checked battery 100B which does not have electrolyte leakage and FIG. 7B is a bi-leveled image 52 (fluorescent image) of a checked battery 100B which has electrolyte leakage.

As apparent by making comparison FIG. 6A and FIG. 6B, the gray-scale image 51 (fluorescent image) of the checked battery 100B indicates a fluorescent image corresponding to the adhered portion 120 whereas the bi-level image 52 indicates all pixels in black. Therefore, as described later, since fluorescence stronger than the threshold is not emitted from the checked battery 100B, it can be judged that electrolyte leakage has not occurred. On the other hand, the bi-level image 52 shown in FIG. 7B indicates the leakage portions 121b and 121c in white. Therefore, as described later, since fluorescence stronger than the threshold is emitted, it can be guessed that electrolyte leakage has occurred.

Next, it goes on to step S6 in which the number of pixels indicated in white in the bi-leveled image 52 is accumulated. Next, it goes on to step S7 in which it is judged whether or not the total number of white pixels exceeds a predetermined value. In case the accumulated number lowers the predetermined value (NO in S7), it goes on to step S8 to judge that electrolyte leakage has not occurred. Specifically, since the total of white pixels in the bi-leveled image 52 shown in FIG. 6B is calculated as 0 in step S6, it goes on to step S8 to judge that electrolyte leakage has not occurred.

Contrarily, in case the accumulated number of white pixels exceeds the predetermined value (YES in S7), it goes on to step S9 to judge that electrolyte leakage has occurred. Specifically, since the total of white pixels in the bi-leveled image 52 shown in FIG. 7B is calculated as exceeding the predetermined value in step S6, it goes on to step S9 to judge that electrolyte leakage has occurred.

After that, checked batteries 100B judged as no electrolyte leakage and checked batteries 100B judged as having electrolyte leakage are sorted. The checked batteries 100B judged as having electrolyte leakage are left out as the defective. On the other hand, the checked batteries 100B judged as no electrolyte leakage are completed as batteries 100 through drying process (drying leakage indicator of an adhered portion 120), and the like.

It is to be noted that there remains the adhered portion 120 to which fluorescein is adhered at the border portion 113 of the battery jar 111 and the sealing member 112 and the neighborhood of the border portion 113 as to the surface on the battery case of a completed battery 100 without being removed (see FIG. 1). It is possible to remove the adhered portion 120 by washing, however, it is preferable to leave the adhered portion 120 as it is. This is because presence/absence of electrolyte leakage can be detected easily by irradiating ultraviolet radiation on battery case's surface of a battery 100 even after used.

In the present embodiment, step S1 corresponds to adhering process and step S2 through S9 corresponds to leakage detecting process. Furthermore, step S4 through S9 out of S2 through S9 corresponds to detecting process.

While the presently preferred embodiment of the present invention has been shown and described, it is to be understood that this disclosure is for the purpose of illustration and that various changes and modifications may be made without departing from the scope of the invention as set forth in the appended claims.

For example, in the embodiment, leakage indicator is sprayed to the border portion 113 (welded portion) of the sealing member 112 and the battery jar 111 and the neighborhood of the border portion 113 out of a surface of the battery case 110, and electrolyte leakage is checked with respect to only the sprayed portion (adhered portion 120). However, check portion of electrolyte leakage is not restricted to the above-mentioned portion. If any, other portions which can possibly cause electrolyte leakage (surrounding of an external terminal and a safety valve, for example) may have leakage check by appropriately spraying leakage indicator.

Furthermore, in the embodiment, presence/absence of electrolyte leakage is judged by forming a gray-scale image 51 of a region including the entirety of a checked battery 100B, then further forming a bi-leveled image 52 of the same region, as shown in FIGS. 6A, 6B and FIGS. 7A and 7B. However, not restricted to the above method, only a portion corresponding to an adhered portion 120 to which leakage indicator has been sprayed may be designated as a judged region and a bi-leveled image 52 of the judged region may be formed for judging presence/absence of electrolyte leakage, for example. By employing the method that a bi-leveled image 52 restricted to an adhered portion 120 is formed and presence/absence of electrolyte leakage is judged on the restricted portion, presence/absence of electrolyte leakage can be judged accurately with less influence of noises and the like.

Furthermore, in the embodiment, a bi-leveled image 52 is formed from a gray-scale image 51 of a checked battery 100B and presence/absence of electrolyte leakage is judged by the thus formed bi-leveled image 52. However, check method of electrolyte leakage is not restricted to this method. For example, a standard image of a battery 100 which does not have electrolyte leakage is previously obtained and difference calculation between the stand image and an image of a checked battery 100B is conducted so that a difference image obtained through difference calculation may be used as a gray-scale image. This method is effective in case a member made of insulating resin, anti-rust agent, and the like adhere to a surface of the battery case 110. That is, insulating resin, anti-rust agent, and the like sometimes emit fluorescence in response to irradiation of ultraviolet radiation, however, noise components can be eliminated by conducting difference calculation.

On the contrary, presence/absence of electrolyte leakage may be judged by visual check on the basis of a gray-scale image 51 of a checked battery 100B without forming a bi-leveled image 52.

Furthermore, in the embodiment, check method of electrolyte leakage in the course of manufacturing process is also described. However, check method is not restricted to check in manufacturing process. It is also applicable to batteries 100 after shipped from a factory. For example, the check method is applicable to a battery 100 which has been used for a predetermined period by a user. Specifically, an adhered portion 120 to which fluorescein is adhered is provided at a border portion 113 of a battery jar 111 and a sealing member 112 and the neighborhood of the border portion, out of a surface on a battery case 110. Therefore, spraying water or ethyl alcohol to the adhered portion 120 can make a state that leakage indicator is sprayed to the border portion 113 of the battery jar 111 and the sealing member 112 and the neighborhood of the border portion 113, similar to step S1 in the embodiment. Accordingly, after that, presence/absence of electrolyte leakage can be detected by conducting series of process which follows to step S2, similar to the embodiment.

Furthermore, in the embodiment, fluorescein is used as fluorescent material, however, fluorescent material is not restricted to it. For example, calcein blue, umbelliferone and the like can be used as fluorescent material usable for alkali battery. However, since fluorescent strength which calcein blue and umbelliferone emit is weak in comparison with fluorescein, detection accuracy of electrolyte leakage is slightly poor. Therefore, fluorescein (solution including fluorescein) is the most preferable as fluorescent material (leakage indicator) for detecting electrolyte leakage of an alkali battery.

Furthermore, the present embodiment describes electrolyte leakage check for alkali battery, however, the inventive check method is applicable to batteries other than alkali battery. However, it is required to select fluorescent material which emits fluorescence in response to irradiation of predetermined light under condition that electrolyte of the battery exists.

Furthermore, in the embodiment, charging/discharging process and aging process are provided before leakage detecting process (S2 through S9) and adhering process (S1). Providing charging/discharging process and aging process make it possible to boost inner pressure of a checked battery 100B, whereby presence/absence of electrolyte leakage can be judged under condition that electrolyte is likely to leak. However, as process to create condition that electrolyte is likely to leak, only either charging/discharging process or aging process may be applied to the to-be-checked battery. Also, as process to create condition that electrolyte is likely to leak, decompressing process, for example, may be provided. Specifically, since inner pressure of a battery can be made comparatively large by laying the to-be-checked battery under decompressed atmosphere of 0.1 MPa or lower, condition that electrolyte is likely to leak can be created for the to-be-checked battery.

What is claimed is:

1. A method of manufacturing a sealed-type battery that includes a battery case and electrolyte housed in the battery case, the battery case including a battery jar and a sealing member welded to an opening end ,surface of the jar to seal the jar, the method comprising:

adhering process to adhere fluorescent material which emits fluorescence in response to ultraviolet light irradiated under condition that alkali metal ions included in the electrolyte exist, to welded portions of the opening end surface of the jar and the sealing member, out of an outer surface of the battery case; and leakage detecting process including irradiating the ultraviolet light to at least a portion adhered with the fluorescent material, out of the outer surface of the battery case, to detect presence/absence of electrolyte leakage based on space size of a portion that belongs to the adhered portion and that emits fluorescent stronger than predetermined fluorescent strength, wherein the electrolyte is an alkali electrolyte and the fluorescent material is chosen from fluorescein, calcein blue, and umbelliferone.

2. The method of manufacturing battery according to claim 1, wherein in the detecting, the adhered portion is imaged by an imaging device to obtain a fluorescent image, and the presence/absence of electrolyte leakage is detected in accordance with number of pixels judged as emitting fluorescence stronger than the predetermined strength.

3. The method of manufacturing battery according to claim 1, wherein the battery jar which has a box shape with a bottom to house power generator elements, and in the adhering, the fluorescent material is adhered in dried liquid form to at least either border of the battery jar and the sealing member or neighborhood of the border, out of the battery case.

4. The method of manufacturing battery according to claim 1, wherein the fluorescent material is fluorescein.

5. The method of manufacturing battery according to claim 4, wherein the portion adhered with fluorescent material emits fluorescence in response to ultraviolet radiation.

6. The method of manufacturing battery according to claim 1, further comprising charging/discharging the battery before the detecting.

7. The method of manufacturing battery according to claim 1, further comprising aging the battery under high temperature atmosphere for a predetermined period before the detecting.

8. The method of manufacturing battery according to claim 1, further comprising decompressing the battery under decompressed atmosphere of 0.1 MPa or lower before the detecting.

9. A method of checking electrolyte leakage for a sealed-type battery which includes a battery case and electrolyte housed in the battery case, the battery case including a battery jar a sealing member welded to an opening end surface of the jar to seal the jar, the method comprising:

irradiating ultraviolet light to a portion adhered with fluorescent material out of an outer surface of the battery case, the fluorescent material emitting fluorescence in response to the ultraviolet light irradiated under condition that alkali metal ions included in the electrolyte exist, and the adhered portion including welded portions of the opening end surface of the battery jar and the sealing member, out of the outer surface of the battery case; and checking presence/absence of electrolyte leakage based on space size of a portion that belongs to the adhered portion and that emits fluorescence stronger than a predetermined fluorescence strength, wherein the electrolyte is an alkali electrolyte and the fluorescent material is chosen from fluorescein, calcein blue, and umbelliferone.

10. The method of manufacturing battery according to claim 9, wherein the fluorescent material is flourescein.

11. The method of checking electrolyte leakage according to claim 10, wherein at least either water or organic solvent is added to at least the adhered portion before irradiating the ultraviolet light which makes the fluorescence emit.

12. The method of manufacturing battery according to claim 9, wherein the portion adhered with fluorescent material emits fluorescence in response to ultraviolet radiation.

13. The method of manufacturing battery according to claim 9, wherein the battery is charged/discharged before irradiating the ultraviolet light which makes the fluorescence emit.

14. The method of manufacturing battery according to claim 9, wherein the battery is laid under high temperature atmosphere for a predetermined period before irradiating the ultraviolet light which makes the fluorescence emit.

15. The method of manufacturing battery according to claim 9, wherein the battery is laid under decompressed atmosphere of 0.1 MPa or lower before irradiating the ultraviolet light which makes the fluorescence emit.

* * * * *